(12) United States Patent
Ackert et al.

(10) Patent No.: US 8,466,578 B2
(45) Date of Patent: Jun. 18, 2013

(54) STEERING WHEEL ARRANGEMENT

(75) Inventors: Holger Ackert, Darmstadt (DE); Jürgen Bender, Frankfurt (DE); Michael Bischoff, Hösbach (DE); Michael Germuth-Löffler, Aschaffenburg (DE); Horst Müller, Florstadt (DE); Thomas Sauerwein, Großwallstadt (DE); Klaus Volz, Goldbach (DE)

(73) Assignee: Takata-Petri AG, Aschaffenburg (DE)

( * ) Notice: Subject to any disclaimer, the term of this patent is extended or adjusted under 35 U.S.C. 154(b) by 1270 days.

(21) Appl. No.: 12/030,017

(22) Filed: Feb. 12, 2008

(65) Prior Publication Data

US 2008/0173127 A1 Jul. 24, 2008

Related U.S. Application Data

(63) Continuation of application No. PCT/DE2006/001429, filed on Aug. 14, 2006.

(30) Foreign Application Priority Data

Aug. 12, 2005 (DE) .......................... 10 2005 038 855

(51) Int. Cl.
*B62D 1/04* (2006.01)
(52) U.S. Cl.
USPC .......................................... 307/9.1; 307/10.1
(58) Field of Classification Search
USPC ...... 307/9.1, 10.1; 180/422, 333, 400; 701/41
See application file for complete search history.

(56) References Cited

U.S. PATENT DOCUMENTS

| 4,578,592 | A | * | 3/1986 | Nakazawa et al. | ........... 307/10.1 |
| 5,769,085 | A | * | 6/1998 | Kawakami et al. | ........... 600/519 |

(Continued)

FOREIGN PATENT DOCUMENTS

| CN | 1422776 A | 6/2003 |
| DE | 37 26 336 A1 | 2/1989 |

(Continued)

OTHER PUBLICATIONS

Office Action issued in counterpart Japanese Application No. 2008-525386 dated May 30, 2011 (4 pages) and an English translation of the same (3 pages).

(Continued)

*Primary Examiner* — Fritz M Fleming
(74) *Attorney, Agent, or Firm* — Fitch, Even, Tabin & Flannery, LLP

(57) ABSTRACT

A steering wheel arrangement for a motor vehicle is provided including a steering wheel, which can be arranged in a rotationally displaceable manner in the motor vehicle, a stationary module which defines a steering axle, whereon the steering wheel is rotationally mounted about the steering axle, and first actuation elements which are arranged on the steering wheel in order to actuate functional elements of the motor vehicle which are arranged in or on the motor vehicle. The arrangement also includes at least one second actuation element which is arranged on the stationary module and which is used to actuate functional elements of the motor vehicle which can be arranged in or on the motor vehicle. According to one form of the invention, a central electronic control element is arranged in the steering wheel, which is fitted in order to control first actuation elements and also in order to control at least one second actuation element. The electronic control element can communicate with a drive-sided electronic element, preferably via a at least one multiplex-interface.

45 Claims, 4 Drawing Sheets

U.S. PATENT DOCUMENTS

| | | | |
|---|---|---|---|
| 5,833,477 | A | 11/1998 | Zahn |
| 6,459,389 | B1 | 10/2002 | Germuth-Loffler et al. |
| 6,961,644 | B2 * | 11/2005 | Mercier et al. ............ 701/36 |
| 7,215,320 | B2 | 5/2007 | Takeuchi et al. |
| 7,278,367 | B1 * | 10/2007 | Gonring et al. ........ 114/144 R |
| 7,680,574 | B2 * | 3/2010 | Berg et al. .................. 701/41 |
| 2004/0084291 | A1 | 5/2004 | Adachi et al. |
| 2004/0117084 | A1 | 6/2004 | Mercier et al. |

FOREIGN PATENT DOCUMENTS

| | | |
|---|---|---|
| DE | 195 06 865 C1 | 4/1996 |
| DE | 195 25 928 A1 | 1/1997 |
| DE | 195 29 533 A1 | 2/1997 |
| DE | 196 25 966 A1 | 1/1998 |
| DE | 197 05 312 A1 | 8/1998 |
| DE | 197 58 104 A1 | 7/1999 |
| DE | 199 27 464 A1 | 12/2000 |
| DE | 199 42 818 A1 | 3/2001 |
| DE | 203 00 016 U1 | 4/2003 |
| DE | 102 14 606 A1 | 10/2003 |
| DE | 103 08 901 A1 | 9/2004 |
| DE | 103 46 691 A1 | 5/2005 |
| EP | 0 822 119 A3 | 2/1998 |
| EP | 0 844 128 B1 | 5/1998 |
| JP | S59-052781 U | 4/1984 |
| JP | H02-095949 A | 4/1990 |
| JP | H10-006999 A | 1/1998 |
| JP | H10-059190 A | 3/1998 |
| JP | 10-100926 | 4/1998 |
| JP | 11-306925 | 11/1999 |
| JP | 2001-328544 A | 11/2001 |
| JP | 2001-357498 A | 12/2001 |
| JP | 2004-090860 A | 3/2004 |
| JP | 2004-171157 A | 6/2004 |
| WO | 2004 053661 A2 | 6/2004 |
| WO | 2004 087484 A1 | 10/2004 |

OTHER PUBLICATIONS

Office Action issued in counterpart Japanese Application No. 2008-525386 dated Apr. 3, 2012 (3 pages) and an English translation of the same (2 pages).

* cited by examiner

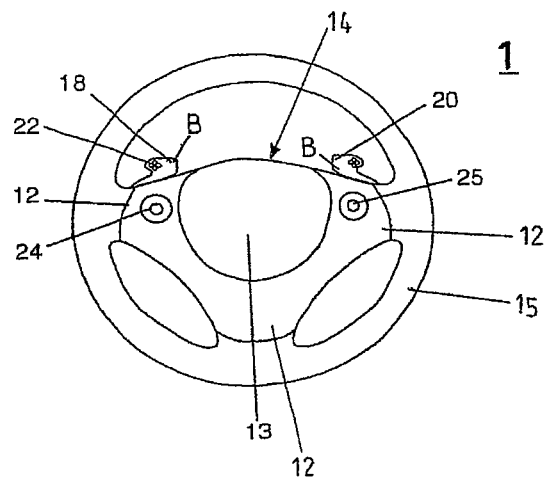
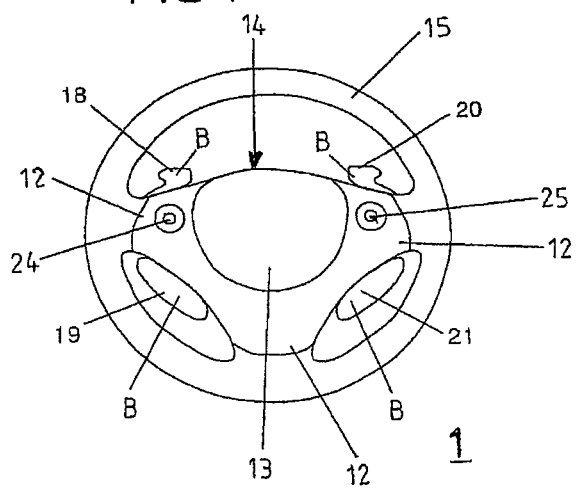
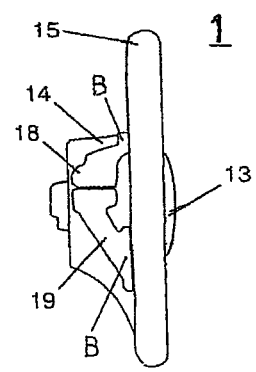

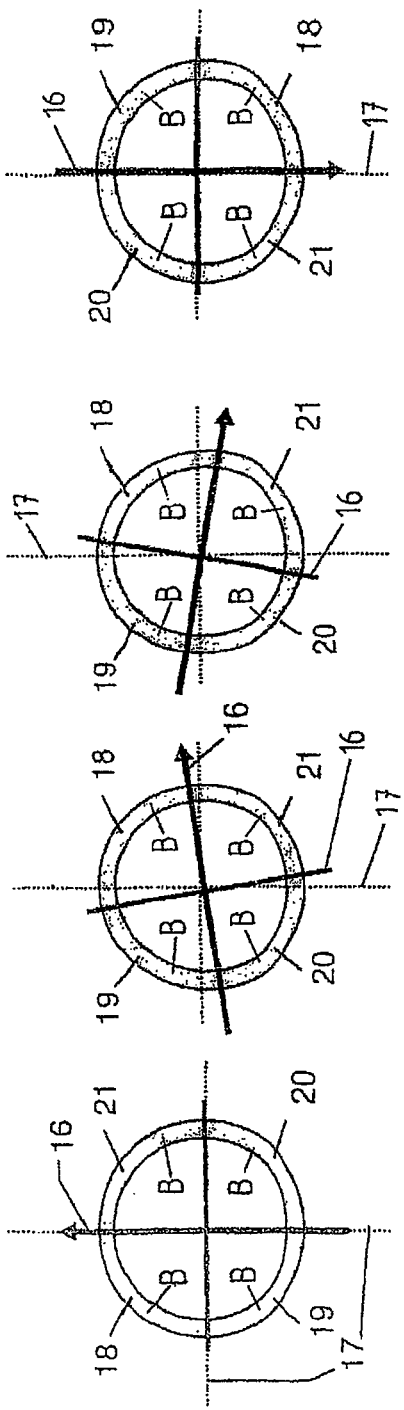

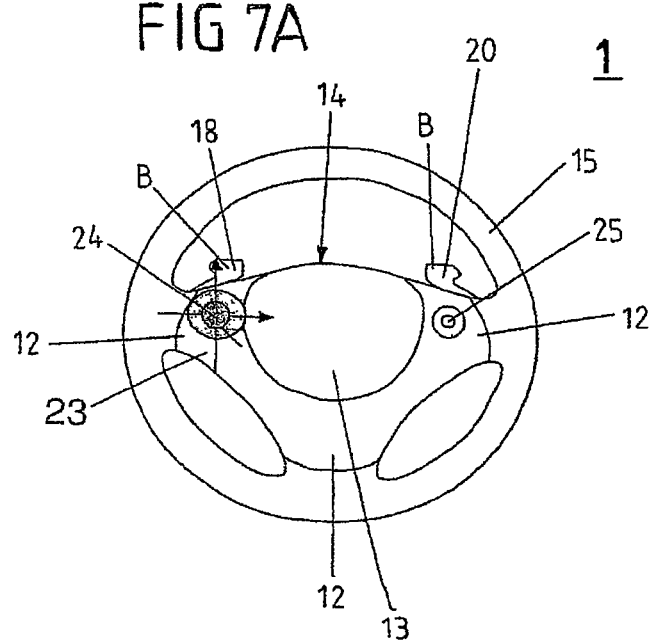
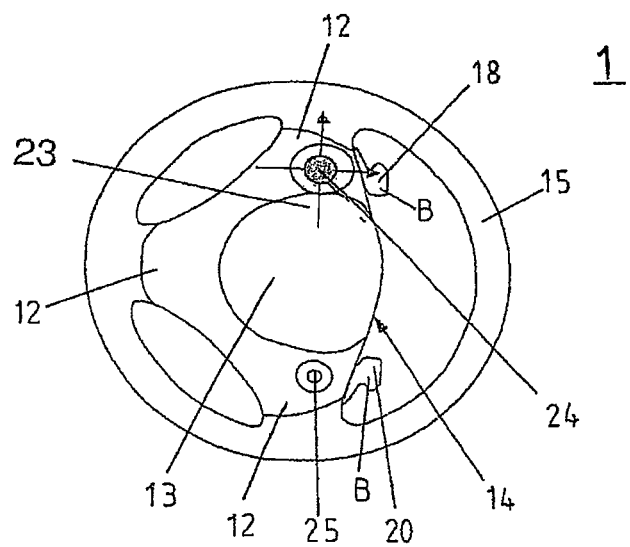

STEERING WHEEL ARRANGEMENT

CROSS REFERENCE TO RELATED APPLICATIONS

This is a continuation application of prior application number PCT/DE2006/001429, filed Aug. 14, 2006 and claims the benefit under 35 U.S.C. §119 of prior foreign application number DE 10 2005 038 855.8, filed Aug. 12, 2005.

FIELD OF THE INVENTION

The invention relates to a steering wheel arrangement.

BACKGROUND OF THE INVENTION

A steering wheel arrangement of this kind has a steering wheel, which may be arranged in the motor vehicle in a rotationally movable manner, a fixed component that defines a steering axis and on which the steering wheel is mounted such that it may rotate about the steering axis, and first actuating elements that are arranged on the steering wheel, for actuating functional elements of the motor vehicle, which may be arranged in or on the motor vehicle, and at least one second actuating element for actuating functional elements of the motor vehicle, which may be arranged in or on the motor vehicle, this latter actuating element being arranged on the fixed component or serving to actuate at least one direction indicator of the motor vehicle.

With this kind of known steering wheel arrangements in motor vehicles with convenient equipment, there is both a first control electronics unit in the steering wheel and a further, second control electronics unit on the side where the fixed component of the steering wheel arrangement is located. The fixed component may for example be a steering column that surrounds a steering spindle, and in this case, conventionally, a control electronics unit which is on the steering column side and has an actuating element for actuating a direction indicator (flasher switch), a steering angle sensor and further functional elements forms a unitary assembly module, which is arranged at an end of the steering column that faces the steering wheel, and further components, which are arranged for example in the steering wheel and have a second control electronics unit which is on the steering wheel side, form an independent steering wheel module.

SUMMARY OF THE INVENTION

The object of the invention is therefore to provide a low-cost, convenient steering wheel arrangement.

This object of the invention is achieved by a steering wheel arrangement having the features as described hereinafter.

In accordance with this, a central control electronics unit is provided, which is arranged in the steering wheel and is set up both to control the first actuating elements and to control the at least one second actuating element.

The advantage of this solution to the object of the invention consists in the fact that no control electronics unit is necessary on the side where the fixed component of the steering wheel arrangement is located. This control electronics unit is set in the steering wheel, that is to say is arranged there, with the result that a steering wheel arrangement having a unitary control electronics unit is created. Even if the at least one second actuating element remains on the fixed component, the above-described advantage is produced, since in this case all that is necessary is simply to link the second actuating element to the unitary control electronics unit that is arranged in the steering wheel. Linking in this way may be carried out for example by means of a simple electrical connection.

In a particularly preferred embodiment of the invention, a steering angle sensor is provided, which is set up to detect the steering angle of the steering wheel. For this purpose, the steering angle sensor, which is preferably arranged on the steering wheel, detects marks which are in the form of an absolute or relative code and may be provided on the fixed component, with the result that absolute or relative movement (rotation) of the steering wheel about the steering axis may be measured. Such steering angle sensors are known, for example from DE 197 58 104 A1 and DE 197 05 312 A1. Furthermore, the steering angle sensor is preferably connected to the control electronics unit, which is set up to control the steering angle sensor.

In this way, it is possible for a functional element of the motor vehicle to be controlled by the control electronics unit, with cooperation with the steering angle sensor. To control functional elements and the first and second actuating elements, the control electronics unit has a microcontroller, the term control being understood to mean at least the activation, deactivation or parameterization of these functional and actuating elements. In the case of a functional element taking the form of a direction indicator, it is thus possible for a set direction indicator for example to be reset automatically in dependence on the steering angle (for example when the steering wheel, having been put in a turned condition to change the direction of travel, is put back in the straight-ahead position).

In a further variant on the invention, the control electronics unit is provided and set up to control at least one of the first actuating elements and/or the at least one second actuating element with the aid of information that characterizes a condition of the motor vehicle or a driver, such as the steering angle, that is to say the angle by which the steering wheel has turned in a direction of rotation of the steering wheel in relation to the straight-ahead position of the steering wheel, a direction of travel of the motor vehicle, the speed of the motor vehicle, a rate of rotation of the steering wheel or a position in which the hands of a driver hold the steering wheel, that is to say locations on a holding surface of the steering wheel (for example the surface of a ring of a steering wheel) on which a driver's hands are located.

Preferably, for transmitting control signals to an electronics unit on the vehicle side, the control electronics unit has at least one multiplex interface, which may also serve to transmit information about the motor vehicle to the control electronics unit. Preferably, an electrical connection between the steering wheel and the fixed component is made by a signal transmission unit, that is to say that the signal transmission unit passes over the multiplex interface to the fixed component and further serves to transmit power to the steering wheel. The signal transmission unit may take the form of a simple cable or curly cable connection, or may be arranged, in the form of a ribbon cable, for example in a cylindrical box that serves to protect the ribbon cable. Signal transmission units of this kind, in the form of cable connections, are known for example from DE 195 06 865 C1 and DE 195 25 928 A1.

In a preferred variant on the invention, the control electronics unit, the steering angle sensor and the signal transmission unit form a functional unit that may be mounted in the steering wheel as a unitary module, which makes the assembly of these components simpler and overall saves costs.

Preferably, at least one of the first actuating elements, which are arranged on the steering wheel, is set up and provided for actuation in a plurality of actuating directions, a respective direction-dependent output signal being associated with the individual actuating directions for acting on a motor vehicle component. In this case, action includes both activation and deactivation and also regulation (adjustment) of the motor vehicle component. In particular, an action of this type includes selection of the motor vehicle component to be adjusted, from a plurality of motor vehicle components.

Preferably, a control electronics unit is provided for controlling the at least one first actuating element, such that the individual actuating directions in which the first actuating element may be actuated in order to generate the respectively associated output signal—in relation to a coordinate system that is fixed with respect to the vehicle—are constant, regardless of the current steering angle of the steering wheel. To put it another way, to generate a predetermined, direction-dependent output signal, the first actuating element has to be deflected, regardless of the current steering angle, in one and the same direction of actuation in each case. The control electronics unit is in particular the central control electronics unit that is arranged in the steering wheel. The current steering angle is detected by means of the steering angle sensor.

The concept of an actuating element that is provided on the steering wheel and is controllable such that its operation always remains the same regardless of the orientation of the steering wheel in relation to a coordinate system that is fixed with respect to the vehicle is a self-contained inventive idea and may also be implemented independently of the present steering wheel arrangement. For this purpose, in the case of a steering wheel for a motor vehicle that is rotatable about a steering axis and has an actuating element that is arranged on the steering wheel, a control unit (control electronics unit) may in general be provided for controlling the actuating element such that the individual actuating directions in which the first actuating element may be actuated to generate the respectively associated output signal—in relation to a coordinate system that is fixed with respect to the vehicle—are constant, regardless of the current steering angle of the steering wheel.

In a particularly preferred variant on the invention, at least one of the first actuating means and/or the at least one second actuating element take the form of a joystick having an operating lever that may be tilted about a plurality of axes in a corresponding plurality of tilting directions (actuating directions), the axes and the tilting directions lying in a common two-dimensional operating plane. A joystick of this kind may for example have an operating lever that takes an elongate form extending in a direction and that, when it is in a neutral condition, that is to say is not inclined, extends perpendicular to the operating plane of the joystick, and that is mounted such that it is tiltable about each of the axes by means of a free end, which lies in the operating plane. In this case, the joystick may be controlled by means of the control electronics unit such that functional elements (for example activation, deactivation, adjustment and so on) of the motor vehicle are controlled in dependence on the tilting directions of the operating lever.

The first actuating elements and/or the at least one second actuating element may also take the form of further known switching elements, such as rotary encoders (rotary pressure controllers), simple switches, switch arrays or membrane switches.

Preferably, the individual axes about which the operating lever of the joystick is tiltable intersect one another at a common point of intersection, the point of intersection preferably being arranged transversely with respect to the steering axis and at a spacing from the steering axis of the steering wheel.

Furthermore, the tilting directions may preferably be unambiguously associated with two-dimensional vectors in an operating coordinate system that is stationary in relation to the joystick, that spans the operating plane and that has a y axis and an x axis at a right angle thereto, with the result that the tilting directions may be processed further without ambiguity by the control electronics unit for controlling functional elements of the motor vehicle. Preferably, the origin of the operating coordinate system coincides with the point of intersection of the axes.

It is of course also conceivable for the control electronics unit to be set up to record the period of time over which the operating lever of the joystick was tilted in a particular tilting direction and to use this to control, in particular adjust, functional elements.

In a variant on the invention, with a joystick arranged on the steering wheel, the control electronics unit is provided and set up to align the operating coordinate system by means of the steering angle sensor such that the orientation of the y axis always corresponds to the orientation of the y axis in the straight-ahead position of the steering wheel, regardless of the steering angle. This is advantageous because it means that a movement of the operating lever of the joystick in a horizontal direction, for example, will always have the same effect on a controlled functional element, or a function of this functional element, regardless of the position of the steering wheel, that is to say regardless of the steering angle. This means that a direction indicator, in particular, can be operated by means of the joystick, independently of the steering angle of the steering wheel.

In a further variant on the invention, a display element that serves at least to display the tilting directions is provided, that is to say the display element displays the tilting direction in which the operating lever of the joystick is tilted.

Preferably, the display element is arranged on the steering wheel, and with a joystick arranged on the steering wheel the display element is preferably grouped around the joystick, the display element preferably being arranged concentrically with respect to the joystick.

In a preferred variant on the invention, the display element has a plurality of individually controllable segments. The individual segments may be adjacent to one another or be arranged on the steering wheel at a spacing from one another. In this case, it is conceivable to recess the display element and its segments into a surface of the steering wheel, for example a surface of the ring of a steering wheel, so that they are flush.

In a particularly preferred variant on the invention, with a joystick arranged on the steering wheel, the control electronics unit is provided and set up for controlling the individual segments of the display element by means of the steering angle sensor such that the alignment of a segment that is associated with a tilting direction, in relation to the origin of the operating coordinate system, is independent of the current steering angle of the steering wheel. Here, the term alignment of the segment in relation to the origin of the operating coordinate system is understood to mean the orientation of a direction in relation to a coordinate system that is fixed with respect to the vehicle, which direction points from the origin of the operating coordinate system toward the segment in question.

In a further variant on the invention, the control electronics unit is provided and set up for storing a steering angle that is determined by means of the steering angle sensor before the control electronics unit is deactivated. This is advantageous because a steering angle of this kind is available again once the control electronics unit is re-activated. Conventionally, in this case, the activation and deactivation of the control electronics unit is coupled to a starting procedure of the motor vehicle.

Preferably, the steering wheel has a steering wheel ring that extends in a plane of extent and is connected by spokes to a steering wheel body.

In a further exemplary embodiment of the invention, a first operating element that is arranged in the direction of the steering axis between the plane of extent of the ring of the steering wheel and the fixed component on the steering wheel is provided. A first operating element of this kind may be part of the group of the first actuating elements and indeed part of the group of the second actuating element if the latter is arranged on the steering wheel.

Preferably, the first operating element has a contact region, at which it may be touched for actuation. It is conceivable for the first operating element to be actuable in a direction by pressing the contact region (for example away from a driver) and optionally by pulling the contact region in an opposing direction. Furthermore, the contact region is arranged in a plane that extends parallel to the plane of extent of the ring of the steering wheel, preferably between the ring of the steering wheel and a spoke of the steering wheel, or between the ring of the steering wheel and the body of the steering wheel. With an appropriate layout of the contact region, this makes it possible for example to actuate a first operating element of this kind with the aid of a thumb (by pressing) or an index or middle finger (by pulling), with the hands otherwise located in the position of holding the steering wheel.

Preferably, the first operating element is mounted such that it is movable on a spoke of the steering wheel, or as an alternative is mounted such that it is movable on the body of the steering wheel. Preferably, the first operating element is in this case mounted on the steering wheel such that the contact region is movable in a direction that is oriented parallel to the steering axis.

In a further exemplary embodiment of the invention, further first operating elements that each have a contact region are provided, these further contact regions being arranged in the plane in which the contact region of the first operating element is arranged.

The further first operating elements may equally well be allocated to the group of the first actuating elements and to the group of the second actuating element or elements, if the latter are arranged on the steering wheel.

Preferably, the contact region of the first operating element and the further contact regions of the further first operating elements (called contact regions of the first operating elements below) are arranged on a path that reaches around the steering wheel body, in such a way that the majority of at least a first contact region is arranged on a right-hand side of the steering wheel, as seen by a driver, regardless of the current steering angle of the steering wheel, and that the majority of at least a second contact region is arranged on a left-hand side of the steering wheel, as seen by the driver, regardless of the current steering angle of the steering wheel. In this arrangement, the steering wheel is divided into the right-hand and the left-hand sides by a plane that is fixed with respect to the vehicle, the plane being formed by the steering axis and a vertical axis intersecting the steering axis. This definition of the right-hand and left-hand sides of the steering wheel is thus independent of the steering angle of the steering wheel.

Furthermore, the control electronics unit is preferably provided and set up for controlling the individual contact regions of the first operating elements by means of the steering angle sensor such that, based on actuation of the at least one first contact region, a display of the direction of travel of the motor vehicle displays a change in the direction of travel to the right regardless of the current steering angle, and that, based on actuation of the at least one second contact region, a display of the direction of travel of the motor vehicle displays a change in the direction of travel to the left regardless of the current steering angle.

The first operating elements may as a whole be part of the group of the first actuating elements and indeed part of the group of the second actuating element, that is to say that they form at least one second actuating element if the latter is arranged on the steering wheel.

Furthermore, the above-mentioned first operating elements, which are controlled in dependence on the steering angle, form a self-contained concept that may be implemented independently of the present steering wheel arrangement, for example in the case of a steering wheel having first operating elements for controlling motor vehicle components, the first operating elements each having a contact region by way of which they are actuable by touching (for example pressing).

In a further variant on the invention, a second operating element, which is arranged on the steering wheel, is provided and is mounted on the steering wheel such that its orientation in space remains unchanged when the steering wheel is rotated about the steering axis, that is to say when the steering angle changes. A second operating element of this kind may also be part of the group of the first actuating elements and indeed part of the group of the second actuating element, if the latter is arranged on the steering wheel.

A second operating element of this kind may also be implemented independently of the present steering wheel arrangement according to the invention, for example in the case of a rotatable steering wheel for a motor vehicle that has an operating element for operating a motor vehicle component.

Preferably, the second operating element is arranged on an element of the steering wheel that is mounted to be movable on the steering wheel, for example by way of a motorized rotational regulator, such that its spatial orientation remains unchanged regardless of the steering angle of the steering wheel, that is to say it is fixed. Preferably, this element is regulated by means of the control electronics unit, which is provided and set up for controlling the orientation of the element of the steering wheel, in cooperation with the steering angle sensor, such that the orientation is aligned regardless of the current steering angle of the steering wheel.

Furthermore, that element is preferably arranged centrally on the steering wheel and preferably takes the form of part of the steering wheel body, in particular an airbag module which is mounted on the steering wheel body.

Preferably, the first actuating elements and the at least one second actuating element serve to actuate functional elements that may be arranged in or on the motor vehicle, in particular for operating a direction indicator, a horn, a radio, a cruise control for regulating the speed of the vehicle, a windscreen wiper or lights for the motor vehicle. The actuating elements may of course also be multifunctional in design and be set up to operate a plurality of these functional components.

As an alternative to arranging the first actuating elements on the steering wheel and the at least one second actuating element on the fixed component (for example the steering column), both the first actuating elements and the at least one second actuating element may be arranged on the steering wheel, a central control electronics unit being provided that is arranged in the steering wheel and is set up both to control the first actuating elements and to control the at least one second actuating element.

Further details and advantages of the invention will become apparent from the description below of exemplary embodiments, which is given with reference to the figures.

BRIEF DESCRIPTION OF THE FIGURES

In the figures:

FIG. 3 shows a diagrammatic view of a steering wheel having operating elements that are arranged on the steering wheel;

FIG. 4 shows a diagrammatic view of a modification to the steering wheel shown in FIG. 3;

FIG. 5 shows a diagrammatic side view of a steering wheel of the type shown in FIG. 4;

FIG. 6A shows a diagrammatic view of contact regions, which are formed in the manner of segments, of operating elements that are arranged in the shape of a ring over a steering wheel body;

FIG. 6B shows a diagrammatic view of the contact regions that are shown in FIG. 6A, in the case of a steering wheel having a steering angle that is not equal to zero and is smaller than 90°;

FIG. 6C shows a diagrammatic view of the contact regions that are shown in FIGS. 6A and 6B, in the case of a steering angle that is not equal to zero and is greater than 90° but smaller than 180°;

FIG. 6D shows a diagrammatic view of the contact regions that are shown in FIGS. 6A to 6C, in the case of a steering angle that is 180°;

FIG. 7A shows a diagrammatic view of a steering wheel of the type that is shown in FIGS. 3 to 5, which is in the straight-ahead position and has a joystick; and FIG. 7B shows a diagrammatic view of the steering wheel that is shown in FIG. 7A and has a steering angle of 90°.

DETAILED DESCRIPTION OF THE PREFERRED EMBODIMENTS

Figure 1:
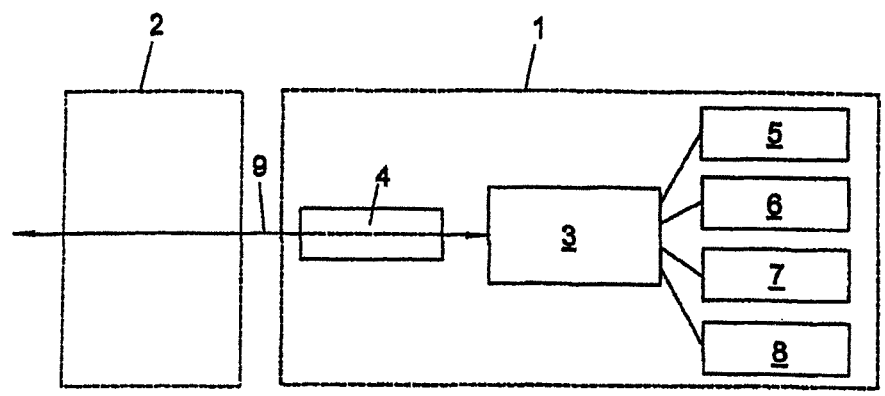
FIG. 1 shows a diagrammatic illustration of one variant on a steering wheel arrangement according to the invention.

FIG. 1 shows a diagrammatic illustration of a steering wheel arrangement having a steering wheel 1 that is mounted on a fixed component 2 such that it is rotationally movable about a steering axis. A component 2 of this kind may be, for example, a steering column, which receives a steering spindle that extends along the steering axis and serves to transmit a rotational movement of the steering wheel 1 to the front wheels of the motor vehicle. Conventionally, the steering wheel 1 is in this case fixed to the steering spindle by way of an individual nut. However, it is also possible for rotational movement of the steering wheel 1 to be transmitted to the front wheels by purely electronic means (steer by wire). To this end, the steering wheel is mounted on the fixed component 2 such that it may rotate about a steering axis, the steering angle being detected in a suitable manner and transmitted to a steering electronics unit for controlling the motor vehicle.

The steering angle is advantageously calibrated such that it is 0° in the straight-ahead position and increases when the steering wheel is turned clockwise (by a driver). The steering angle may be determined by means of a steering angle sensor 5, which is arranged on the steering wheel 1 and is connected to the control electronics unit 3.

Furthermore, arranged on the steering wheel 1 are a first actuating element 7 in the form of a joystick, a second actuating element 6 for operating a direction indicator (flasher switch), and further first actuating elements 8 for actuating a radio, a cruise control, etc. These actuating elements are also connected to the control electronics unit 3 and are controlled by the latter as a function of information on a driving condition or a motor vehicle condition, for example the steering angle that is determined by the steering angle sensor 5. In this context, control of these actuating elements is understood to mean activation, deactivation and parameterization of the actuating elements. Communication with an electronics unit which is on the vehicle side is by way of a multiplex interface 9 that is passed from a signal transmission unit 4 (which serves to link the steering wheel 1 electrically to the fixed component 2) to a central electronics unit which lies outside the fixed component on the vehicle side. Both control signals to functional elements that are arranged in or on the motor vehicle and indeed information on driving and motor vehicle conditions are transmitted to the control electronics unit 3 by way of the multiplex interface 9.

Thus, with the steering wheel arrangement that is shown in FIG. 1, all the actuating elements are integrated in the steering wheel and are controlled by a central control electronics unit. The fixed component 2 (for example a steering column) is free of electronics, with the result that there is greater design freedom for the fixed component 2 and, moreover, a volume of space that is gained thereby may be used for example for safety components (e.g. a knee airbag).

Figure 2:
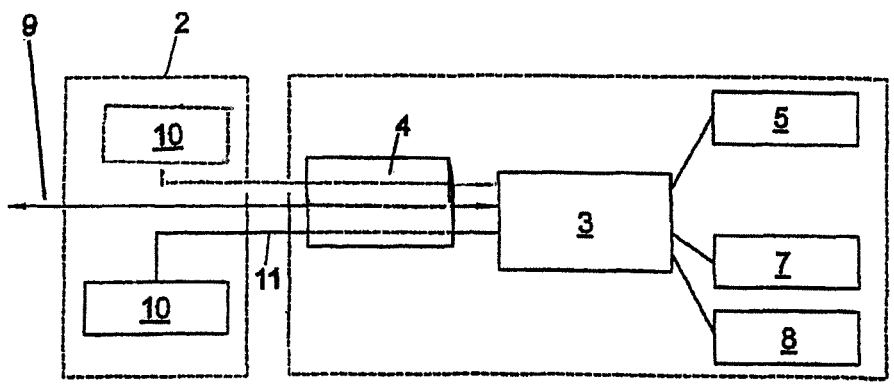
FIG. 2 shows a diagrammatic illustration of a further variant on a steering wheel arrangement according to the invention.

FIG. 2 shows a modification to the steering wheel arrangement that is shown in FIG. 1, in which, unlike FIG. 1, a second actuating element 10 that serves to actuate a direction indicator remains on the fixed component 2. This second actuating element 10 is in this case linked to the control electronics unit 3 by means of an electrical connection 11, it being possible for the control electronics unit 3 to communicate with functional elements that are arranged in the environment of the steering wheel 1 within the motor vehicle by way of a multiplex interface 9, in the manner described above. In this case, too, a unitary, central control electronics unit 3 serves to control all the first and second actuating elements 6, 7, 8 and 10.

FIG. 3 shows a plan view of a steering wheel 1 having a steering wheel ring 15, which is ring-shaped and extends in a plane of extent coinciding with the plane of the paper. The steering wheel ring 15 is constructed substantially concentrically with respect to the steering axis (which extends perpendicular to the plane of extent of the steering wheel ring) and surrounds a steering wheel body 14 which is spaced apart from the steering wheel ring 15 and has a flat, roundish steering wheel cover 13 that extends in the plane of extent of the steering wheel ring 15. The steering wheel body 14 is connected to the steering wheel ring 15 by way of three spokes 12, which are also arranged in the plane of extent of the steering wheel ring 15. In this case, one of the three spokes 12 extends in the straight-ahead position of the steering wheel 1, from a portion of the steering wheel ring 15 that is located below the steering axis, in a vertical direction, toward the steering axis, to the steering wheel body 14, with its cross section (perpendicular to that direction) becoming larger toward the steering wheel body 14. In the straight-ahead position of the steering wheel 1, the other two spokes 12 project away from the steering wheel body 14, to either side of the steering axis, along a horizontal axis lying in the plane of extent of the steering wheel ring 15, and extend in tapering manner toward the steering wheel ring 15, with the result that the three spokes 12 are arranged overall in a T shape with respect to one another.

In the straight-ahead position of the steering wheel 1, there is located along the above-described horizontal axis, on either side of the steering wheel cover 13, which serves for example to cover an airbag module, a respective joystick 24, 25, each of which has an operating lever that extends in a direction parallel to the steering axis. The two operating levers of the joysticks 24, 25 are mounted such that at a respective end, which faces the steering wheel 1, they are tiltable about a plurality of axes that extend in an operating plane that coincides substantially with the plane of extent of the steering wheel ring 15. These axes may be predetermined or freely selectable.

FIG. 7A shows, in conjunction with FIG. 7B and by way of the example of the joystick 24, control of the joystick 24 by means of the control electronics unit 3 and the steering angle sensor 5. This is done in such a way that an operating coordinate system 23 that is associated with the joystick 24 by the control electronics unit 3 is fixed. This means that the alignment of the operating coordinate system 23 always remains the same, regardless of the value of the steering angle, as shown diagrammatically in FIG. 7A (steering angle of 0°) and FIG. 7B (steering angle of 90°).

In this way, regardless of the steering angle, a movement or tilt of the joystick 24, for example to the right along the horizontal axis, always has the same effect, which the control electronics unit can of course determine. The joysticks 24, 25 may for example be used to operate a direction indicator. This is also conceivable in combination with conventional actuating elements for a direction indicator, which are arranged on the fixed component 2.

Furthermore, in accordance with FIG. 3, first operating elements 18, 20 are arranged on the steering wheel 1, and these take the form of a lever in accordance with FIG. 5 and are mounted to be movable on two mutually remote sides of the steering wheel body 14 when the steering wheel 1 is in the straight-ahead position, the two sides extending substantially perpendicular to the plane of extent of the steering wheel ring 15 and being oriented parallel to the vertical axis of the vehicle.

The first operating elements 18, 20 have contact regions B, each having a side facing the driver, the contact regions B being arranged in a plane that extends parallel to the plane of extent of the steering wheel ring 15 between the horizontal spokes 12 and a top portion of the steering wheel ring 15 (in the straight-ahead position of the steering wheel 1). The plane in which the two contact regions B extend is arranged in the direction of the steering axis between the plane of extent of the steering wheel ring 15 and the fixed component 2. The two actuating elements 18, 20 are constructed such that the contact regions B may be pressed and pulled in directions that each extend parallel to the steering axis, with the result that for example a display of the direction of travel for displaying a change of direction of travel to the right may be activated by pressing the contact region B of the first operating element 20 in the straight-ahead direction of the motor vehicle and may be deactivated by pulling (in opposition to the straight-ahead direction of the motor vehicle).

Information on the driving condition, or for example conditions of the first operating elements 18, 20, may be displayed by means of display elements 22, which are arranged on the first operating elements 18, 20 and are constructed on the visible contact regions B of the first operating elements 18, 20.

FIG. 4 shows an extension to the above-described operating concept. In FIG. 4, unlike FIG. 3, two further first operating elements 19, 21 are arranged on the steering wheel 1, and these can also serve to activate or deactivate a direction indicator. These two further first operating elements 19, 21 are also mounted movably on the two mutually remote sides of the steering wheel body 14 and have elongate contact regions B that extend over the steering wheel body 14 and cover a larger surface, parallel to the plane of extent of the steering wheel ring 15, than the contact regions B of the first operating elements 18, 20. When the steering wheel 1 is in the straight-ahead position, the contact regions B of the further first operating elements 19, 21 extend below the horizontal spokes 12 and along the steering wheel body 14, and each lie opposite one of those contact regions B of the first operating elements 18, 20 that lie above the horizontal spokes 12. The further first operating elements 19, 21 may be actuated in a similar manner to the first operating elements 18, 20 and may of course also be set up to control a direction indicator.

The contact regions B of the first operating elements 18, 20, 19 and 21 thus divide the steering wheel ring into four quadrants. The advantage of an arrangement of this kind is based on the fact that in principle, whatever the steering angle of the steering wheel 1, one of the contact regions B is arranged on the left-hand side and one on the right-hand side of the steering wheel 1 respectively, at least over a certain portion. This can then be used to activate or deactivate a corresponding direction indicator by means of the control electronics unit 3. This concept is illustrated diagrammatically in FIGS. 6A to 6D.

FIG. 6A shows, in conjunction with FIGS. 6B, 6C and 6D, a diagrammatic plan view of a steering wheel 1 of the type that is shown in FIGS. 3 to 5, having four individually actuable, segment-type contact regions B of the first operating elements 21, 20, 19 and 18, which are arranged in the shape of a ring around the steering wheel body 14 (which is not illustrated in FIGS. 6A to 6D), in a plane that is parallel to the plane of extent of the steering wheel ring 15 (the steering wheel ring 15 is not shown in FIGS. 6A to 6D either) and that is arranged between this plane of extent and the fixed component 2. This means that the contact regions B reach around the steering wheel body 14 in the plane that is parallel to the plane of extent of the steering wheel ring 15. The contact regions B are in particular arranged at a spacing from the steering wheel ring 15. This is advantageous because it makes a separation of the steering procedures and the flashing procedures (setting and resetting a direction indicator) possible.

The contact regions B that reach around the steering wheel body 14 each extend over a quarter of the periphery of the steering wheel body 14 in the plane that is parallel to the plane of extent of the steering wheel ring 15, and thus form a ring around the steering wheel body 14. This means that, whatever the steering angle of the steering wheel 1, at least one of the contact regions B is located entirely on the above-defined right-hand (left-hand) side of the steering wheel 1 and at least half of a further contact region B that is adjacent thereto is located on the right-hand (left-hand) side of the steering wheel 1. These contact regions B may be associated with a right-hand (left-hand) direction indicator by the control electronics unit 3, with the result that two contact regions B are always available on the right-hand (left-hand) side of the steering wheel 1 and can be used to set or reset a right-hand (left-hand) direction indicator.

With a steering angle of 0° like that in FIG. 6A, the control electronics unit 3 accordingly acts to control the first operating elements 21, 20 as actuating elements of a right-hand direction indicator. In FIGS. 6B and 6C (steering angle of approximately 90°), these would be the operating elements 18 and 21. With a steering angle of 180° in accordance with FIG.

6D, the control electronics unit 3 acts to control the first operating elements 19 and 18 as actuating elements of a right-hand direction indicator.

In order to act to control the individual contact regions B of the first operating elements 18, 19, 20 and 21 in the above-described manner, the control electronics unit 3 must be constructed to determine the steering angle, that is to say the angle between the axes of a fixed coordinate system 17 and the same axes of a coordinate system 16 that is stationary in relation to the steering wheel 1. This is done in known manner with the aid of the steering angle sensor 5.

What is claimed is:

1. A steering wheel arrangement for a motor vehicle, having
   a steering wheel, arranged in the motor vehicle in a rotationally movable manner,
   a fixed component that defines a steering axis and on which the steering wheel is mounted to permit the steering wheel to rotate about the steering axis,
   first actuating elements that are arranged on the steering wheel, for actuating functional elements of the motor vehicle, arranged in or on the motor vehicle, and
   at least one second actuating element for actuating functional elements of the motor vehicle, arranged in or on the motor vehicle, the at least one second actuating element being arranged on the fixed component,
   characterized in that a central control electronics unit is provided, which is integrated into the steering wheel and is set up both to control the first actuating elements arranged on the steering wheel and to control the at least one second actuating element arranged on the fixed component.

2. The steering wheel arrangement as claimed in claim 1, characterized in that a steering angle sensor is provided, which is set up to determine the steering angle of the steering wheel.

3. The steering wheel arrangement as claimed in claim 2, characterized in that the steering angle sensor is arranged on the steering wheel.

4. The steering wheel arrangement as claimed in claim 2, characterized in that the steering angle sensor is connected to the control electronics unit.

5. The steering wheel arrangement as claimed in claim 4, characterized in that the control electronics unit is set up to control the steering angle sensor.

6. The steering wheel arrangement as claimed in claim 1, characterized in that the control electronics unit is provided and set up to control at least one of the first actuating elements and/or the at least one second actuating element with the aid of a selection of the following information:
   the steering angle,
   a direction of travel of the motor vehicle,
   a speed of the motor vehicle,
   a rate of rotation of the steering wheel, or
   a position in which the hands of a driver hold the steering wheel.

7. The steering wheel arrangement as claimed in claim 1, characterized in that the control electronics unit is connected to the fixed component by way of a signal transmission unit.

8. The steering wheel arrangement as claimed in claim 7, characterized in that the control electronics unit has at least one multiplex interface for transmitting control signals to a motor vehicle environment.

9. The steering wheel arrangement as claimed in claim 7, characterized in that the control electronics unit, the steering angle sensor for determining the steering angle of the steering wheel, and the signal transmission unit form a unitary module that may be integrated in the steering wheel.

10. The steering wheel arrangement as claimed in claim 1, characterized in that at least one first actuating element, which is arranged on the steering wheel, is actuable in a plurality of actuating directions, a respective direction-dependent output signal being associated with the individual actuating directions for acting on a motor vehicle component.

11. The steering wheel arrangement as claimed in claim 10, characterized by a control electronics unit for controlling the at least one first actuating element, such that the individual actuating directions in which the first actuating element may be actuated in order to generate the respectively associated output signal—in relation to a coordinate system that is fixed with respect to the vehicle—are constant, regardless of the current steering angle of the steering wheel.

12. The steering wheel arrangement as claimed in claim 11, characterized in that, to generate a predetermined, direction-dependent output signal, the first actuating element has to be deflected, regardless of the current steering angle, in one and the same direction of actuation in each case.

13. The steering wheel arrangement as claimed in claim 10, characterized in that the at least one first actuating element and/or the at least one second actuating element take the form of a joystick having an operating lever that may be tilted about a plurality of axes in a corresponding plurality of tilting directions, the axes and the tilting directions lying in a common two-dimensional operating plane.

14. The steering wheel arrangement as claimed in claim 13, characterized in that the axes intersect at a point of intersection.

15. The steering wheel arrangement as claimed in claim 14, characterized in that the point of intersection is arranged transversely with respect to the steering axis and at a spacing from the steering axis.

16. The steering wheel arrangement as claimed in claim 13, characterized in that the tilting directions may be unambiguously associated with two-dimensional vectors in an operating coordinate system that is stationary in relation to the joystick, that spans the operating plane and that has a y axis and an x axis at a right angle thereto.

17. The steering wheel arrangement as claimed in claim 16, characterized in that the origin of the operating coordinate system coincides with the point of intersection.

18. The steering wheel arrangement as claimed in claim 16, characterized in that, with the joystick arranged on the steering wheel, the control electronics unit is provided and set up to align the operating coordinate system by means of a steering angle sensor for determining the steering angle of the steering wheel such that the orientation of the y axis always corresponds to the orientation of the y axis in the straight-ahead position of the steering wheel (1), regardless of the steering angle.

19. The steering wheel arrangement as claimed in claim 13, characterized in that a display element that serves at least to display the tilting directions is provided.

20. The steering wheel arrangement as claimed in claim 19, characterized in that the display element is arranged on the steering wheel.

21. The steering wheel arrangement as claimed in claim 20, characterized in that, with the joystick arranged on the steering wheel, the display element surrounds the joystick.

22. The steering wheel arrangement as claimed in claim 21, characterized in that the display element is arranged concentrically with respect to the joystick.

23. The steering wheel arrangement as claimed in claim 19, characterized in that the display element has a plurality of segments.

24. The steering wheel arrangement as claimed in claim 23, characterized in that, with the joystick arranged on the steering wheel, the control electronics unit is provided and set up for controlling the individual segments by means of the steering angle sensor (5) such that the alignment of a segment that is associated with a tilting direction, in relation to the origin of the operating coordinate system, is independent of the current steering angle of the steering wheel.

25. The steering wheel arrangement as claimed in claim 2, characterized in that the control electronics unit is provided and set up for storing a steering angle that is determined by means of the steering angle sensor before the control electronics unit is deactivated.

26. The steering wheel arrangement as claimed in claim 1, characterized in that the steering wheel has a steering wheel ring that extends in a plane of extent and is connected by spokes to a steering wheel body.

27. The steering wheel arrangement as claimed in claim 26, characterized in that the steering wheel has a first operating element that is mounted in the direction of the steering axis between the plane of extent of the ring of the steering wheel and the fixed component on the steering wheel.

28. The steering wheel arrangement as claimed in claim 27, characterized in that the first operating element has a contact region, at which the first operating element may be touched for actuation of the first operating element.

29. The steering wheel arrangement as claimed in claim 28, characterized in that the contact region is arranged in a plane that extends parallel to the plane of extent of the ring of the steering wheel.

30. The steering wheel arrangement as claimed in claim 29, characterized in that the contact region is arranged in the plane between the ring of the steering wheel and a spoke.

31. The steering wheel arrangement as claimed in claim 29, characterized in that the contact region is arranged in the plane between the ring of the steering wheel and the body of the steering wheel.

32. The steering wheel arrangement as claimed in claim 27, characterized in that the first operating element is mounted such that it is movable on a spoke.

33. The steering wheel arrangement as claimed in claim 27, characterized in that the first operating element is mounted such that it is movable on the body of the steering wheel.

34. The steering wheel arrangement as claimed in claim 28, characterized in that the first operating element is mounted on the steering wheel such that the contact region is movable in a direction that is oriented parallel to the steering axis.

35. The steering wheel arrangement as claimed in claim 28, characterized in that the steering wheel has further first operating elements, and in that the further first operating elements each have a further contact region, the further contact regions being arranged in the plane in which the contact region of the first operating element is arranged.

36. The steering wheel arrangement as claimed in claim 35, characterized in that the contact region of the one first operating element and the further contact regions of the further first operating elements are arranged over the steering wheel body, in such a way that the majority of at least a first one of the contact regions is arranged on a right-hand side of the steering wheel, as seen by a driver, regardless of the current steering angle of the steering wheel, and that the majority of at least a second one of the contact regions is arranged on a left-hand side of the steering wheel, as seen by the driver, regardless of the current steering angle of the steering wheel.

37. The steering wheel arrangement as claimed in claim 36, characterized in that the control electronics unit is provided and set up for controlling the first operating element and the further first operating elements by means of a steering angle sensor for determining the steering angle of the steering wheel such that, based on actuation of the at least one first contact region, a display of the direction of travel of the motor vehicle displays a change in the direction of travel to the left regardless of the steering angle, and that, based on actuation of the at least one second contact region, a display of the direction of travel of the motor vehicle displays a change in the direction of travel to the right regardless of the steering angle.

38. The steering wheel arrangement as claimed in claim 35, characterized in that the first operating element and/or the further first operating elements are part of the group of the first actuating elements.

39. The steering wheel arrangement as claimed in claim 27, characterized in that the steering wheel has a second operating element, which is mounted on the steering wheel, such that its orientation in space remains unchanged when the steering wheel is rotated.

40. The steering wheel arrangement as claimed in claim 39, characterized in that the second operating element is arranged on an element of the steering wheel that is mounted to be movable on the steering wheel such that its spatial orientation is independent of the steering angle of the steering wheel.

41. The steering wheel arrangement as claimed in claim 40, characterized in that the control electronics unit is provided and set up for controlling the orientation of the element of the steering wheel by means of the steering angle sensor, such that it is independent of the current steering angle of the steering wheel.

42. The steering wheel arrangement as claimed in claim 40, characterized in that the element is arranged centrally on the steering wheel.

43. The steering wheel arrangement as claimed in claim 40, characterized in that the element is part of the steering wheel body, in particular an airbag module which is mounted on the steering wheel body.

44. The steering wheel arrangement as claimed in claim 39, characterized in that the second operating element is part of the group of the first actuating elements.

45. The steering wheel arrangement as claimed in claim 1, characterized in that the first actuating elements and the at least one second actuating element are set up to actuate a selection of the following functional elements, which may be arranged in or on the motor vehicle:
a direction indicator,
a horn,
a radio,
a cruise control,
a windscreen wiper,
lights for the motor vehicle.

* * * * *